(12) United States Patent
Barnes

(10) Patent No.: US 11,483,984 B2
(45) Date of Patent: Nov. 1, 2022

(54) TRELLIS

(71) Applicant: NZ TUBE MILLS LIMITED, Lower Hutt (NZ)

(72) Inventor: Paul Barnes, Lower Hutt (NZ)

(73) Assignee: NZ Tube Mills Limited, Lower Hutt (NZ)

( * ) Notice: Subject to any disclaimer, the term of this patent is extended or adjusted under 35 U.S.C. 154(b) by 110 days.

(21) Appl. No.: 17/000,753

(22) Filed: Aug. 24, 2020

(65) Prior Publication Data

US 2021/0084839 A1 Mar. 25, 2021

(30) Foreign Application Priority Data

Sep. 23, 2019 (NZ) ........................ 757505

(51) Int. Cl.
*A01G 17/06* (2006.01)
*A01G 9/12* (2006.01)
*A01G 13/02* (2006.01)

(52) U.S. Cl.
CPC ............. *A01G 17/06* (2013.01); *A01G 9/12* (2013.01); *A01G 13/0206* (2013.01)

(58) Field of Classification Search
CPC .......... A01G 17/06; A01G 9/12; A01G 17/00; A01G 17/14; A01G 9/122; A01G 13/0206; A01G 2017/065; A01G 17/10; A01G 9/126
USPC .......................................... 47/44, 45, 46, 47
See application file for complete search history.

(56) References Cited

FOREIGN PATENT DOCUMENTS

| CN | 206698952 | U | * | 12/2017 | ............. | A01G 17/06 |
|---|---|---|---|---|---|---|
| GB | 2305346 | A | * | 4/1997 | ............. | A01G 9/122 |
| JP | 2004065206 | A | * | 3/2004 | ............. | A01G 9/12 |
| KR | 100556229 | B1 | * | 3/2006 | ............. | A01G 9/122 |
| KR | 10-2009-0019959 | A | * | 2/2009 | ............. | A01G 9/122 |
| KR | 20-2015-0001904 | U | * | 5/2015 | ............. | A01G 9/128 |
| KR | 20-2016-0001255 | U | * | 4/2016 | ............. | A01G 17/04 |
| KR | 20-2017-0001250 | U | * | 4/2017 | ............. | A01G 17/10 |
| KR | 101789433 | B1 | * | 10/2017 | ............. | A01G 9/12 |
| KR | 10-2019-0049644 | A | * | 5/2019 | ......... | A01G 13/0206 |
| KR | 102185761 | B1 | * | 12/2020 | ............. | A01G 17/14 |
| KR | 10-2209631 | B1 | * | 1/2021 | ............. | A01G 17/14 |
| KR | 102240919 | B1 | * | 4/2021 | ............. | A01G 17/10 |
| KR | 20210054692 | A | * | 5/2021 | ............. | A01G 9/122 |
| NZ | 588880 | A | * | 2/2012 | ............. | E04H 17/22 |

* cited by examiner

*Primary Examiner* — Kathleen I Alker
(74) *Attorney, Agent, or Firm* — Chambliss, Bahner & Stophel, P.C.

(57) ABSTRACT

Trellis arrangements are used for supporting fruit-bearing plants as they grow. A problem in some orchards or the like is that it can be difficult to install trellis posts in the ground, in particular when the posts are relatively long and difficult to place at the correct angle. The invention discloses a trellis comprising a plurality of supports, each support comprising a shaft embedded in a ground, and at least one connector arm extending upwards at an acute angle with respect to the ground. The trellis is such that for each support, a post is sleeve-fitted to the connector arm so that the post extends upwards at an acute angle but does not touch the ground; the upwardly extending posts collectively support elevated lines running between the posts; and the lines support branches of a fruit bearing plant growing along the lines.

14 Claims, 6 Drawing Sheets

TRELLIS

FIELD OF INVENTION

Figure 1:
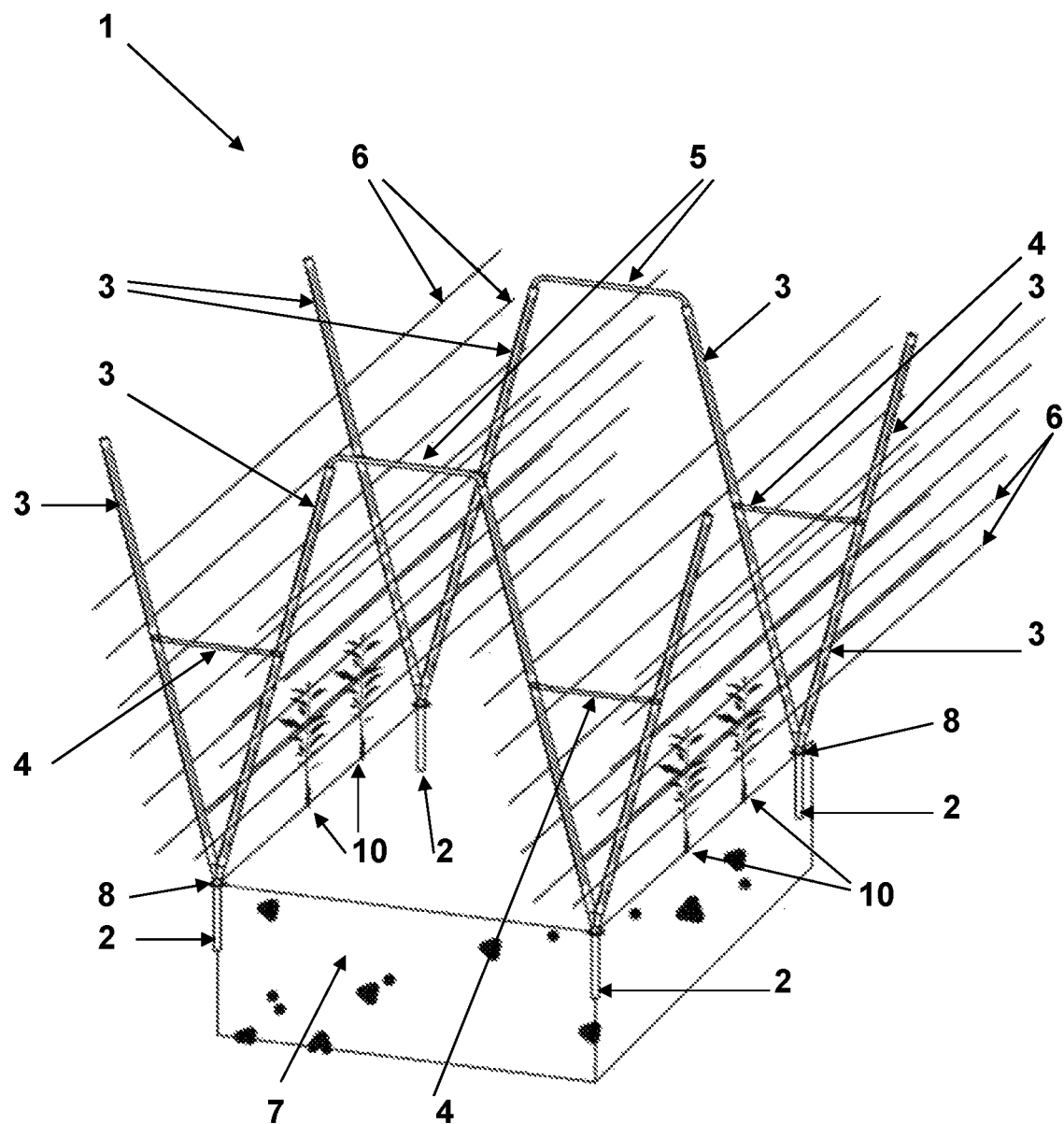

A preferred form of the invention relates to a trellis for supporting fruit plants.

BACKGROUND

It is known to install a trellis having a series of wires held in an elevated fashion. The wires are used for supporting fruit-bearing plants as they grow. A problem in some orchards or the like is that it can be difficult to install trellis posts in the ground, in particular when the posts are relatively long and difficult to place at the correct angle. It is an object of a preferred form of the invention to go at least some way towards addressing this problem. While this applies to the preferred embodiment, it should be understood that the object of the invention per se is simply to provide the public with a useful choice. Therefore object of the preferred embodiment should not be seen as a limitation on any claims expressed more broadly.

SUMMARY OF THE INVENTION

According to one aspect of the invention there is provided a trellis comprising a plurality of supports, each support comprising:
a shaft embedded in a ground; and
at least one connector arm extending upwards at an acute angle with respect to the ground;
the trellis being such that:
for each support, a post is sleeve-fitted to the connector arm so that the lower end of the post is held out of the ground and the post extends upwards at an acute angle;
the upwardly extending posts collectively support elevated lines running between the posts; and
the lines support branches of a fruit bearing plant growing along the lines.

Optionally each support has at least a second connector arm extending upwards and outwards at an acute angle with respect to the ground, a post is sleeve fitted to that arm and the posts of the two arms are substantially in 'V' formation.

Optionally the upper end of at least some of the posts extending from neighbouring supports are connected by a cross support to enhance rigidity of the trellis.

Optionally at least two posts fitted to the same support are connected by an elevated bracing cross link.

Optionally each support comprises a further connector arm that extends generally vertically and is sleeve fitted with a generally vertically extending further post.

Optionally the vertically extending posts support a netting canopy over the fruit bearing plants.

Optionally each shaft has a ground retention flange that engages the ground and that limits the distance to which the shaft extends into the ground.

Optionally each fruit bearing plant has branches growing horizontally along the lines.

Optionally each post sleeve fits outside its corresponding connector arm.

Optionally each post sleeve fits inside its corresponding connector arm.

According to a further aspect of the invention there is provided a trellis comprising a cross link and a plurality of supports, each support comprising:
a shaft embedded in a ground;
a ground retention flange; and
two connector arms extending upwards and outwards, each at an acute angle with respect to the ground;
the trellis being such that:
for each support, a post is sleeve-fitted to each of the connector arms so that the lower end of the post is held out of the ground and each post extends upwards and outwards at an acute angle and the posts of the two arms are substantially in 'V' formation;
the upwardly extending posts collectively support elevated lines running between the posts and the lines in turn support branches of a fruit bearing plant growing along the lines;
two of the posts that are fitted to the same support are connected by the cross link; and
the ground retention flange engages the ground and limits the amount to which the shaft can tilt, lift out of or sink into the ground.

DRAWINGS

Figure 2:
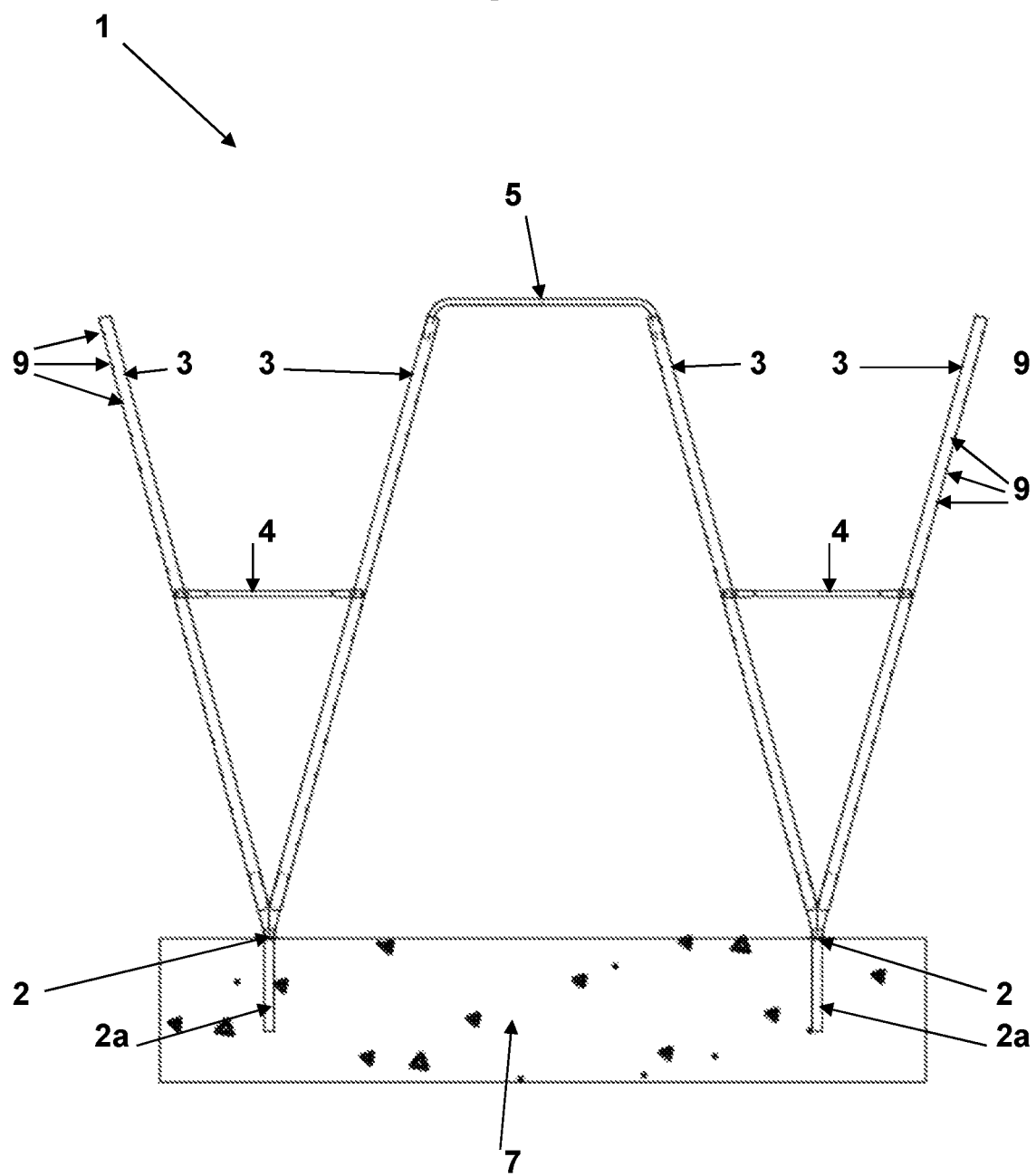
Figure 3:
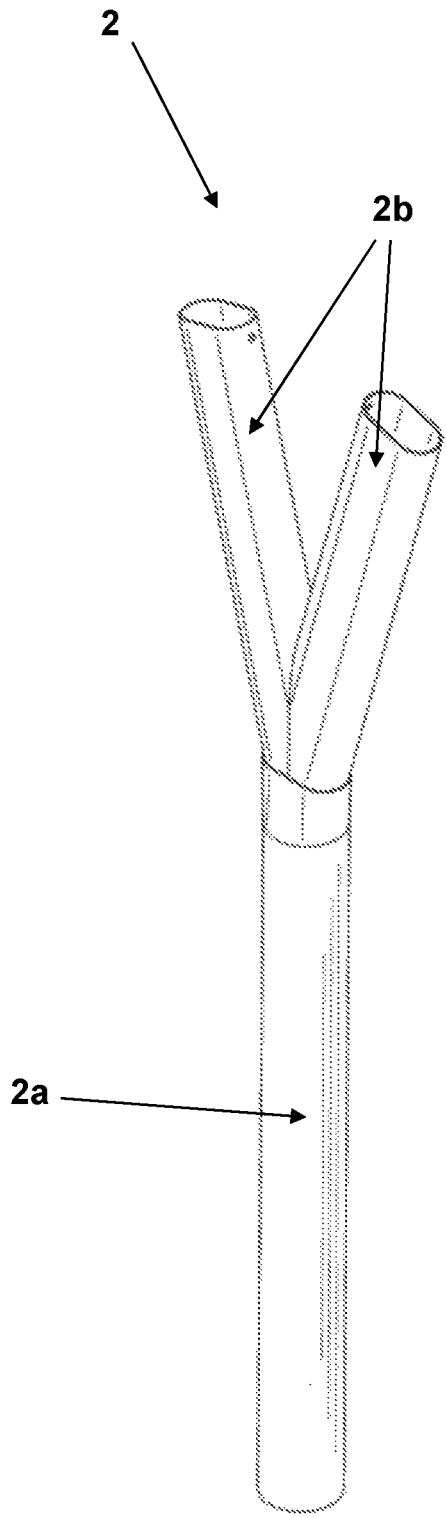
Figure 4:
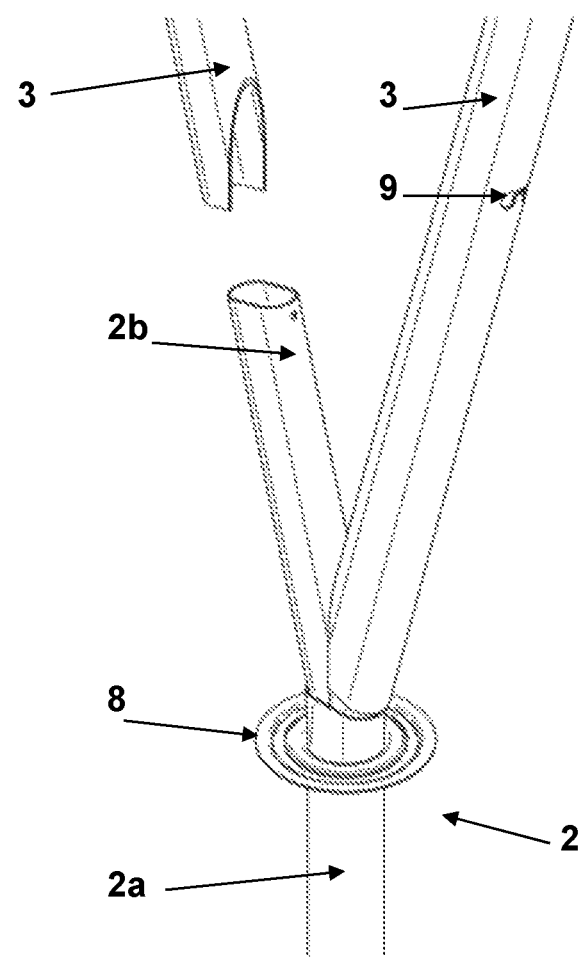
Figure 5:
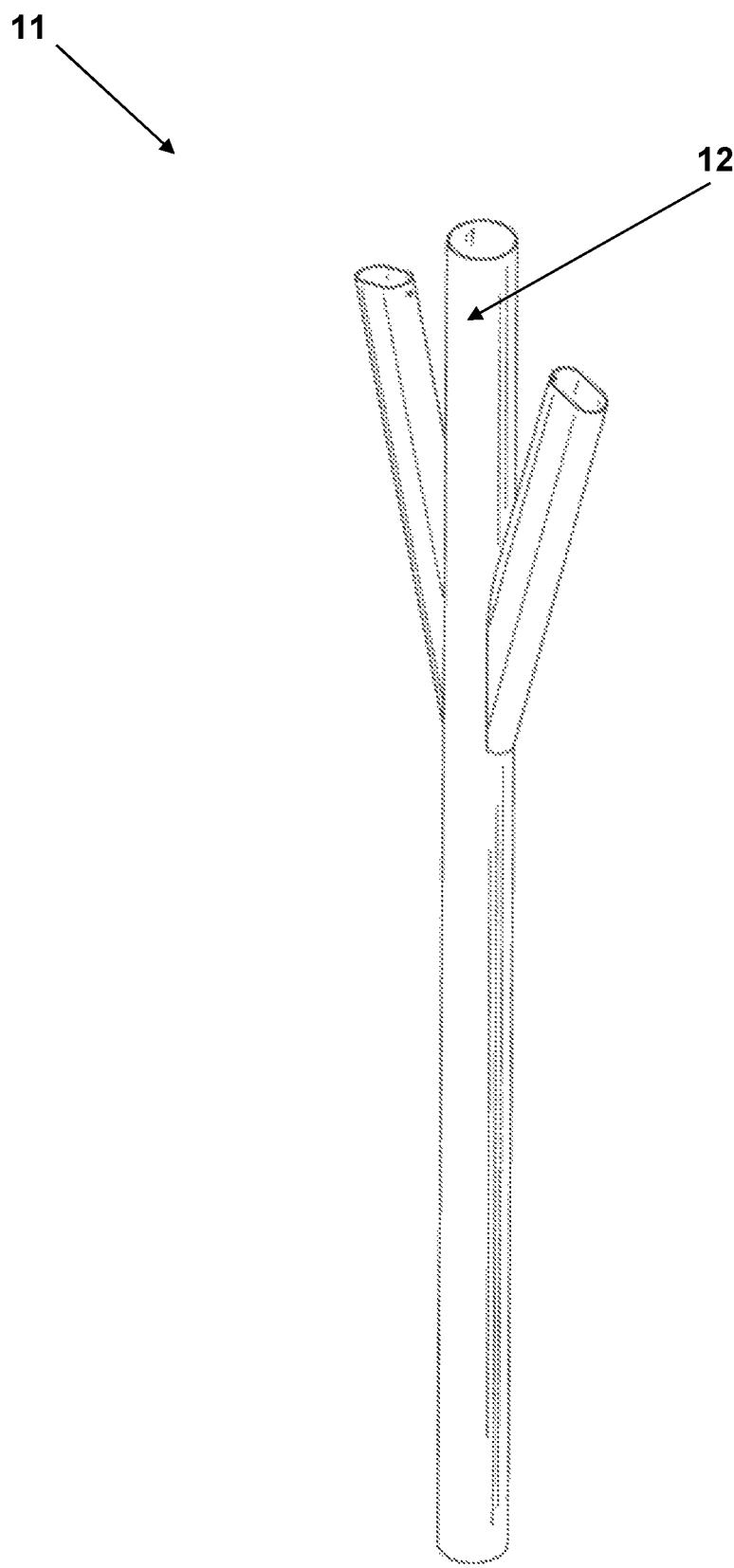
Figure 6:
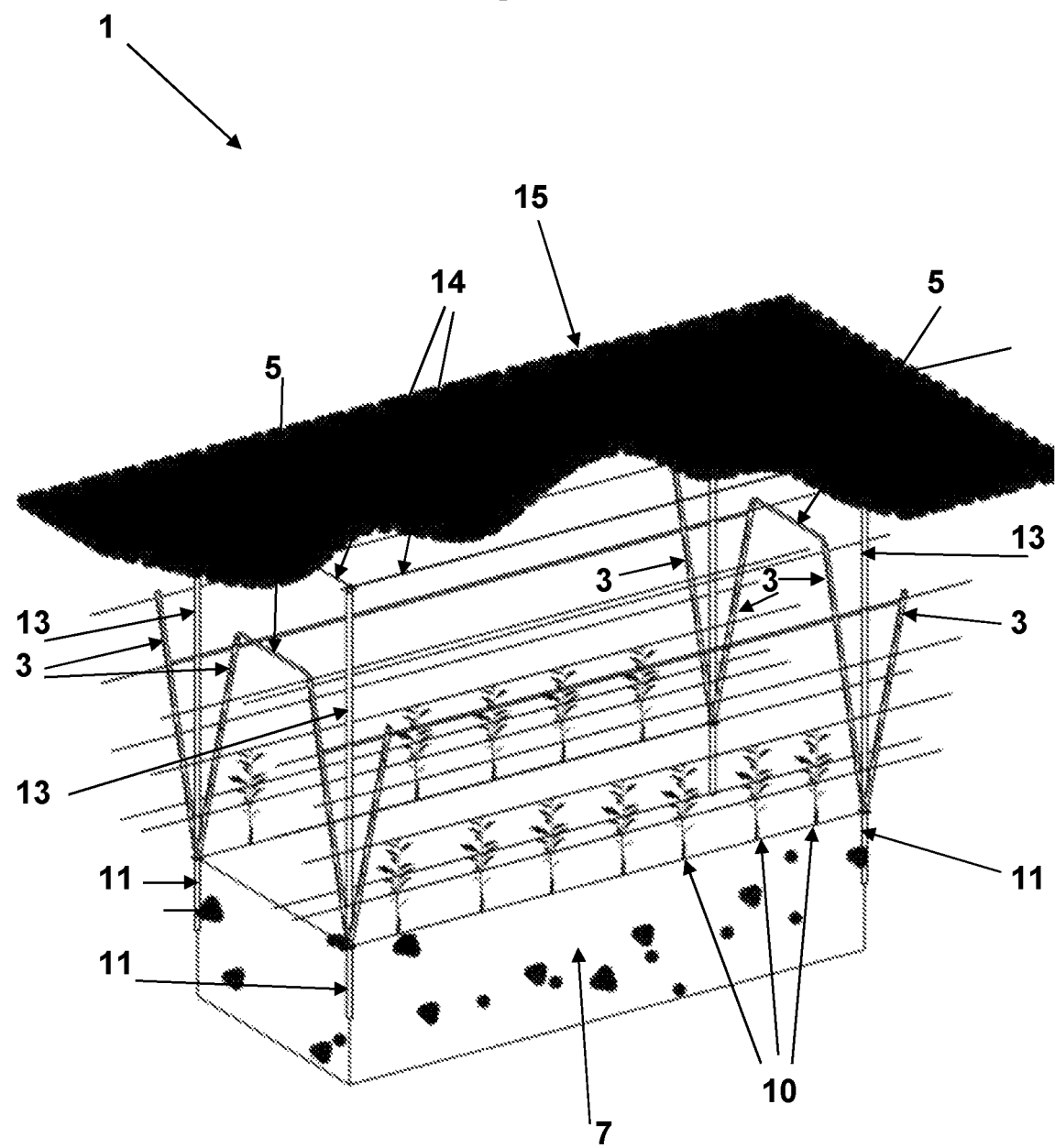
Figure 7:
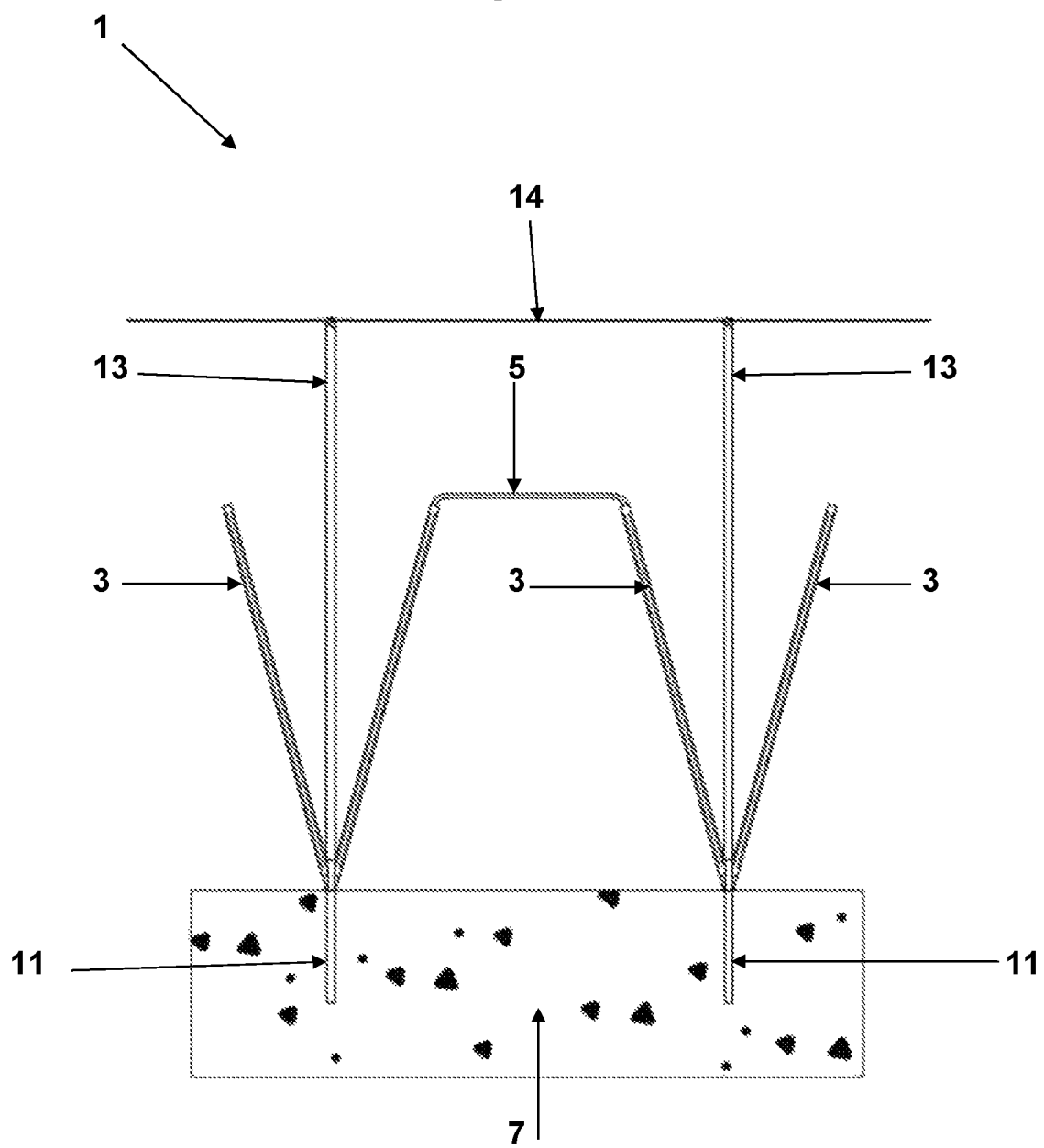

Some preferred embodiments of the invention will now be described by way of example and with reference to the accompanying drawings and images, of which:
FIG. 1 is an isometric view of a trellis supporting the branches of fruit trees;
FIG. 2 is a front-on view of the trellis but without the trees;
FIG. 3 is an isometric view of a support component of the trellis;
FIG. 4 is an isometric view of part of the support component plus posts forming part of the trellis;
FIG. 5 is an isometric view of an alternative embodiment of the support component;
FIG. 6 is an isometric view of an alternative embodiment of the trellis; and
FIG. 7 is a front-on view of the alternative embodiment of the trellis but without the trees.

DETAILED DESCRIPTION

Referring to FIGS. 1-3, the trellis 1 comprises a plurality of supports 2, a series of posts 3, elevated bracing cross links 4, cross supports 5, and a plurality of lines 6.

Referring especially to FIG. 3, each support 2 comprises a tubular, hollow shaft 2a aligned generally vertically within the ground with a pair of substantially V-shaped connector arms 2b extending above ground level at an acute angle with respect to the ground. In the preferred embodiment the shaft 2a is circular in cross section. The connector arms 2b are also tubular and hollow and are preferably obround in shape, that is, in cross section the sides have parallel straight lines with hemispherical ends. Alternatively the connector arms 2b are circular in cross section and/or the shaft 2a may be obround in shape.

The shaft 2a and connector arms 2b are made of black steel and are welded together before being fully hot dip galvanised. The shaft 2a is preferably 600 mm in length but is alternatively between 500 mm and 1500 mm.

The connector arms 2b are between 300 mm and 1000 mm in length. The angle of the arms 2b with respect to the shaft 2a is preferably between 10 and 12 degrees, but may be between 8 and 20 degrees.

To assemble the trellis 1, each support 2 is installed in the ground 7 of an orchard or vineyard, etc. A hole may be dug so that the full length of the shaft 2a of the support 2 may be set into it. This enables any rocks or other underground obstacles to be cleared to prevent them obstructing installation of the shaft 2a. Alternatively the shaft 2a may be driven into the ground 7 to its full length.

Referring to FIG. 4, optionally a ground retention flange 8 is arranged over the shaft 2a at the point where the connector arms 2b branch out. If the ground 7 is soft or loose, the flange 8 assists in preventing the support 2 tilting, lifting or sinking.

Referring to FIG. 4, once the support 2 is firmly positioned in the ground 7, posts 3 are attached to the upwardly acute angled connector arms 2b, the posts being dimensioned to slide telescopically over the arms 2b. In FIG. 4 the support 2 is shown with one post 3 in place in a snug fit over one connector arm 2b, with a second post 3 ready to be slid over the other connector arm 2b. Alternatively the posts 3 may be adapted to slide inside the connector arms 2b.

Referring to FIG. 2, the cross links 4 are mounted between respective pairs of the posts 3 to provide structural bracing. The cross supports 5 have curved ends and telescopically slide in a snug fit into the upper ends of posts 3. The cross supports 5 bridge neighbouring posts 3 to enhance rigidity of the trellis 1.

The installation process is repeated so that there are multiple rows of supports 2 with posts 3 and cross links 4. The posts 3 of each row are linked to an adjacent row by the cross supports 5.

Referring to FIG. 4, each post 3 has a series of apertures 9 with a raised tab in each. Each line 6, for example a wire, is placed or hooked over the tabs. In this way a series of lines 6 are secured in rows in a horizontal disposition.

Referring to FIG. 1, once the trellis 1 is assembled, plants 10 are arranged along the trellis rows and their branches are trained onto the lines 6 so that the branches grow horizontally along the lines 6. Plants 10 that the trellis 1 is particularly suitable for use with include pip fruit trees, for example apple trees and cherry trees. The trellis may also be used for supporting and training growth of other fruit bearing plants, for example pear trees, plum trees, peach trees, nectarine trees and grape vines.

The trellis 1 assists in the fruit ripening process because the plants 10 have their branches spread along the lines 6 rather than growing in a bunched manner. This means that sun can more easily reach the developing fruit.

When the plants 10 bear fruit then it is harvested by horticultural workers moving between the rows. Fruit grown on the trellis 1 may be easier to pick when branches are trained to the lines 6 because the fruit is less likely to be bunched and is therefore easier to access.

Referring to FIG. 6, it is often desirable to cover the fruit plants 10 with netting to prevent the fruit being damaged, for example by birds, frost or hail. Referring now to FIGS. 5-7 collectively, in an alternative embodiment of the invention a second support 11 comprises a central arm 12. The central arm 12 is adapted to receive an extension post 13. The extension post 13 is sized to slide telescopically over the central arm 12 at its lower end to be sleeve-fitted to, and to extend vertically from, the second support 10. Alternatively the post 13 may be adapted to sleeve fit inside the central arm 12.

A series of canopy support wires 14 are attached to the upper ends of the posts 13, and a netting canopy 15 is fixed over the wires 14 to provide protection to fruiting plants 10. In this embodiment of the invention there are no cross links 4 between the posts 3.

In terms of disclosure, this document contemplates and hereby discloses any feature mentioned above in combination with any number of the other same or other features mentioned herein. This disclosure applies even if such combinations have not been claimed.

While some preferred embodiments of the invention have been described by way of example it should be appreciated that modifications and improvements can occur without departing from the scope of the following claims.

What is claimed is:

1. A trellis for supporting branches of fruit-bearing plants growing along one or more elevated lines of the trellis, the trellis comprising:
   a plurality of supports, and each support comprising:
      a shaft embedded in a ground; and
      at least one connector arm integrally formed with and fixedly positioned with respect to the shaft and extending upwards at an acute angle with respect to the ground;
      a post sleeve-fitted with each connector arm so that a lower end of the at least one connector arm is held out of the ground and the post extends upwards at an acute angle with respect to the ground; and
   wherein the one or more elevated lines are supported between the posts of the plurality of supports.

2. A trellis according to claim 1, wherein the at least one connector arm of each support comprises two connector arms extending upwards from the shaft and extending outwards away from one another at an acute angle with respect to the ground, and a separate post corresponds to and is sleeve fitted to each connector arm such that the posts of the two connector arms are arranged substantially in a 'V' formation.

3. A trellis according to claim 2, wherein an upper end of at least one adjacent pair of posts extending from separate supports of the plurality of supports are connected by a cross support to enhance rigidity of the trellis.

4. A trellis according to claim 2, wherein one of the two posts extending upwards from each support is connected together with another one of the two posts by an elevated bracing cross link.

5. A trellis according to claim 2 wherein each post sleeve fits outside its corresponding connector arm.

6. A trellis according to claim 2, wherein each post sleeve fits inside its corresponding connector arm.

7. A trellis according to claim 1, wherein each support comprises a further connector arm that extends generally vertically and is sleeve fitted with a generally vertically extending further post.

8. A trellis according to claim 7, wherein the vertically extending posts support a netting canopy over the fruit bearing plants.

9. A trellis according to claim 1 wherein each shaft has a ground retention flange that engages the ground and that limits a distance to which the shaft extends into the ground.

10. A trellis according to claim 1 wherein the one or more elevated lines are arranged horizontally such that branches of fruit bearing plants grow horizontally along the one or more elevated lines.

11. A trellis according to claim 1, wherein each support comprises:
   a ground retention flange; and
   the at least one connector arm of each support comprises two connector arms extending upwards and outwards at an acute angle with respect to the ground;
   the trellis being such that:
   for each support, the posts are sleeve-fitted to each of the connector arms so that each post extends upwards and outwards at an acute angle and the posts of the two connector arms are substantially in 'V' formation;

the posts collectively support elevated lines running between the posts and the lines in turn are configured to support the branches of the fruit bearing plants growing along the lines;

an upper end of at least some of the posts extending from neighboring supports formed by the plurality of supports are connected by a cross support to enhance rigidly of the trellis;

the posts sleeve fitted to each support are connected by an elevated bracing cross link; and each shaft is hollow and the ground retention flange engages the ground and limits an amount to which the shaft can tilt, lift out of or sink into the ground.

12. A trellis comprising:

a first pair of adjacent supports and a second pair of adjacent supports, wherein each support includes:

a shaft configured to be embedded in a ground; and a pair of connector arms integrally formed with and fixedly positioned with respect to the shaft and extending upwards at an acute angle with respect to the ground;

a post sleeve-fitted with each connector arm such that the post extends upwards at an acute angle with respect to the ground, wherein the posts, in combination, provide:

a first pair of adjacent posts provided by one post fitted to one of the first pair of adjacent supports that is located adjacent one post fitted to another one of the first pair of adjacent supports; and a second pair of adjacent posts provided by one post fitted to one of the second pair of adjacent supports that is located adjacent one post fitted to another one of the second pair of adjacent supports;

a first cross support connecting together an upper end of the first pair of adjacent supports and a second cross support connecting together an upper end of the second pair of adjacent supports to enhance rigidity of the trellis; and one or more elevated lines extending between the posts of the first and second pair of adjacent supports, wherein the one or more elevated lines are configured to support branches of fruit-bearing plants growing along the one or more elevated lines.

13. The trellis of claim 12 wherein, in combination, the posts fitted to each support are arranged substantially in a 'V' formation.

14. The trellis of claim 12 further comprising an elevated bracing cross link connected together each pair of connector arms of the first pair of adjacent supports and second pair of adjacent supports.

* * * * *